Oct. 25, 1949.  E. J. KEARNEY ET AL  2,486,294
MACHINE TOOL TRANSMISSION
Original Filed June 9, 1938  10 Sheets-Sheet 2

INVENTORS
E. J. KEARNEY, Deceased,
by O. W. CARPENTER JR., Admr.,
J. B. ARMITAGE & W. M. POHL
BY  W. D. O'Connor
ATTORNEY Oct. 25, 1949.  E. J. KEARNEY ET AL  2,486,294
MACHINE TOOL TRANSMISSION
Original Filed June 9, 1938   10 Sheets-Sheet 3

INVENTORS
E. J. KEARNEY, Deceased,
by O. W. CARPENTER JR., Admr.,
J. B. ARMITAGE & W. M. POHL
BY  W. D. O'Connor
ATTORNEY

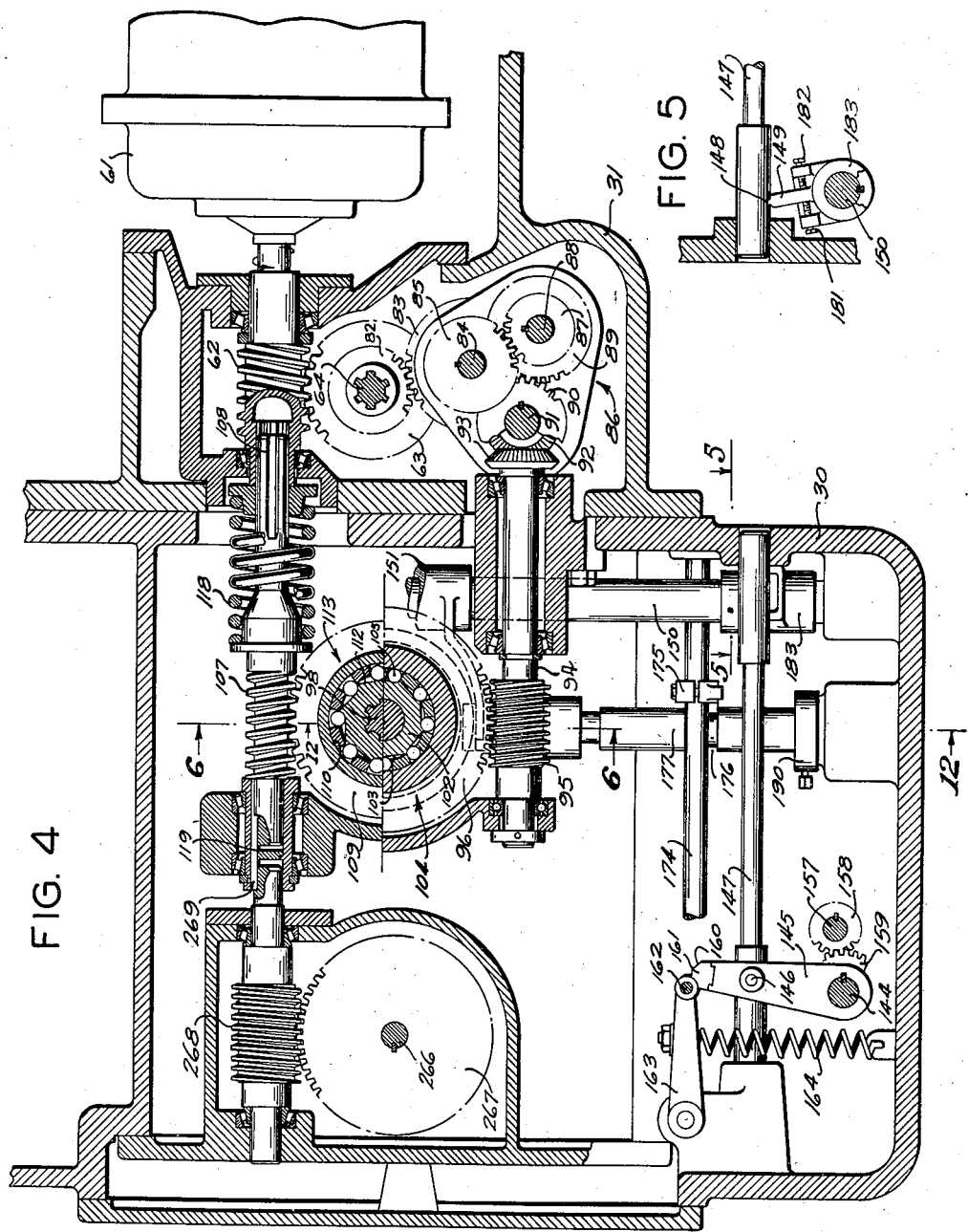

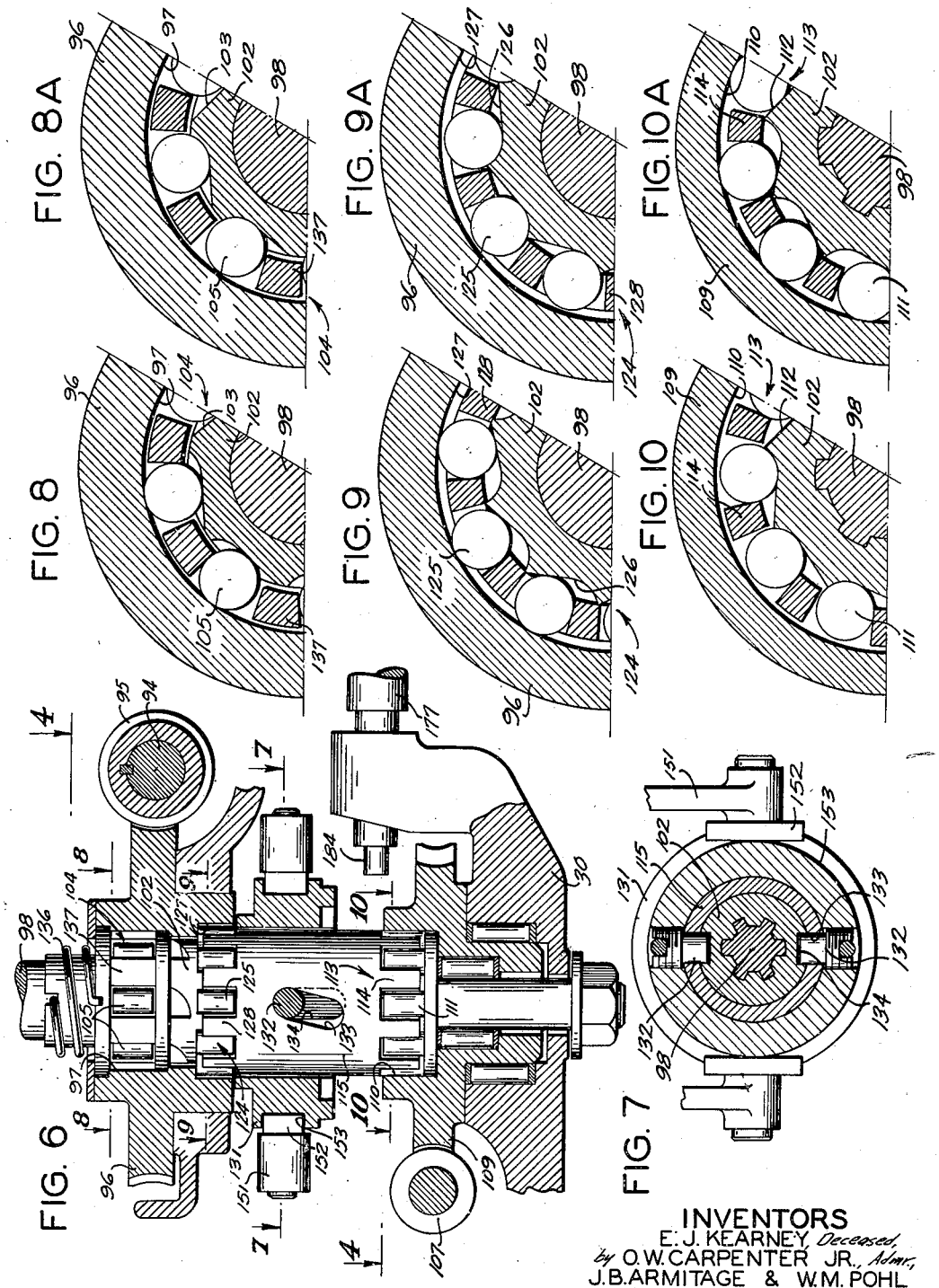

Oct. 25, 1949.　　　E. J. KEARNEY ET AL　　　2,486,294
MACHINE TOOL TRANSMISSION
Original Filed June 9, 1938　　　10 Sheets-Sheet 6

INVENTORS
E. J. KEARNEY, Deceased,
by O. W. CARPENTER JR., Admr.,
J. B. ARMITAGE & W. M. POHL
BY W. D. O'Connor
ATTORNEY INVENTORS
E.J. KEARNEY, Deceased,
by O.W. CARPENTER JR., Admr.,
J.B. ARMITAGE & W.M. POHL
BY W. D. O'Connor
ATTORNEY

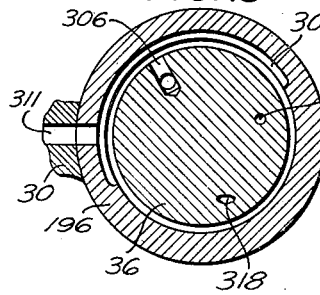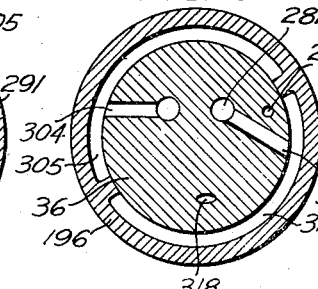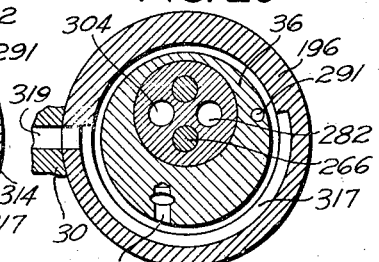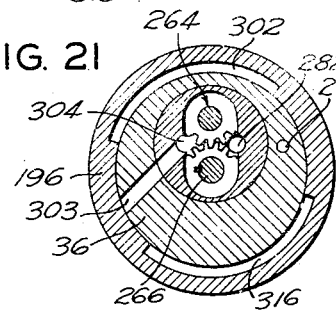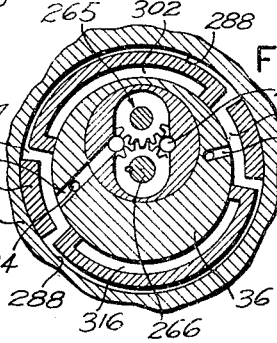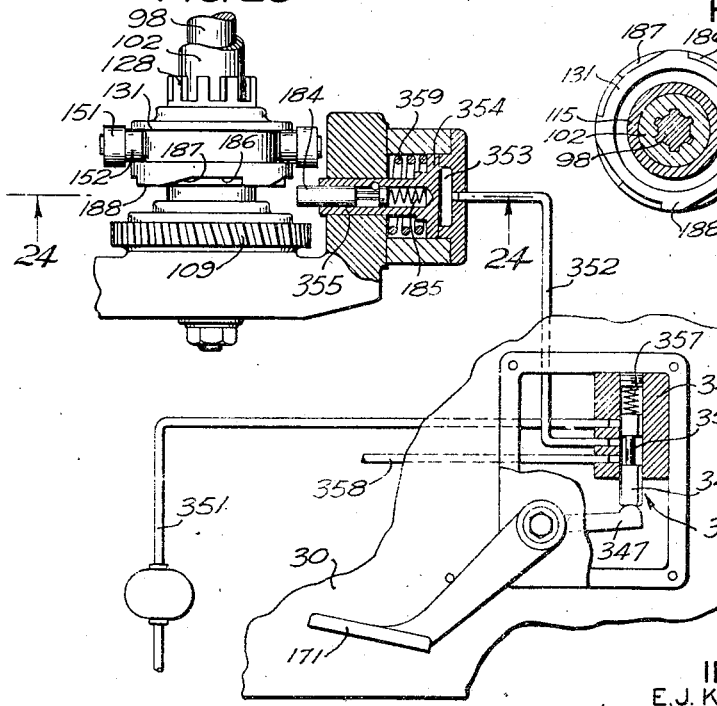

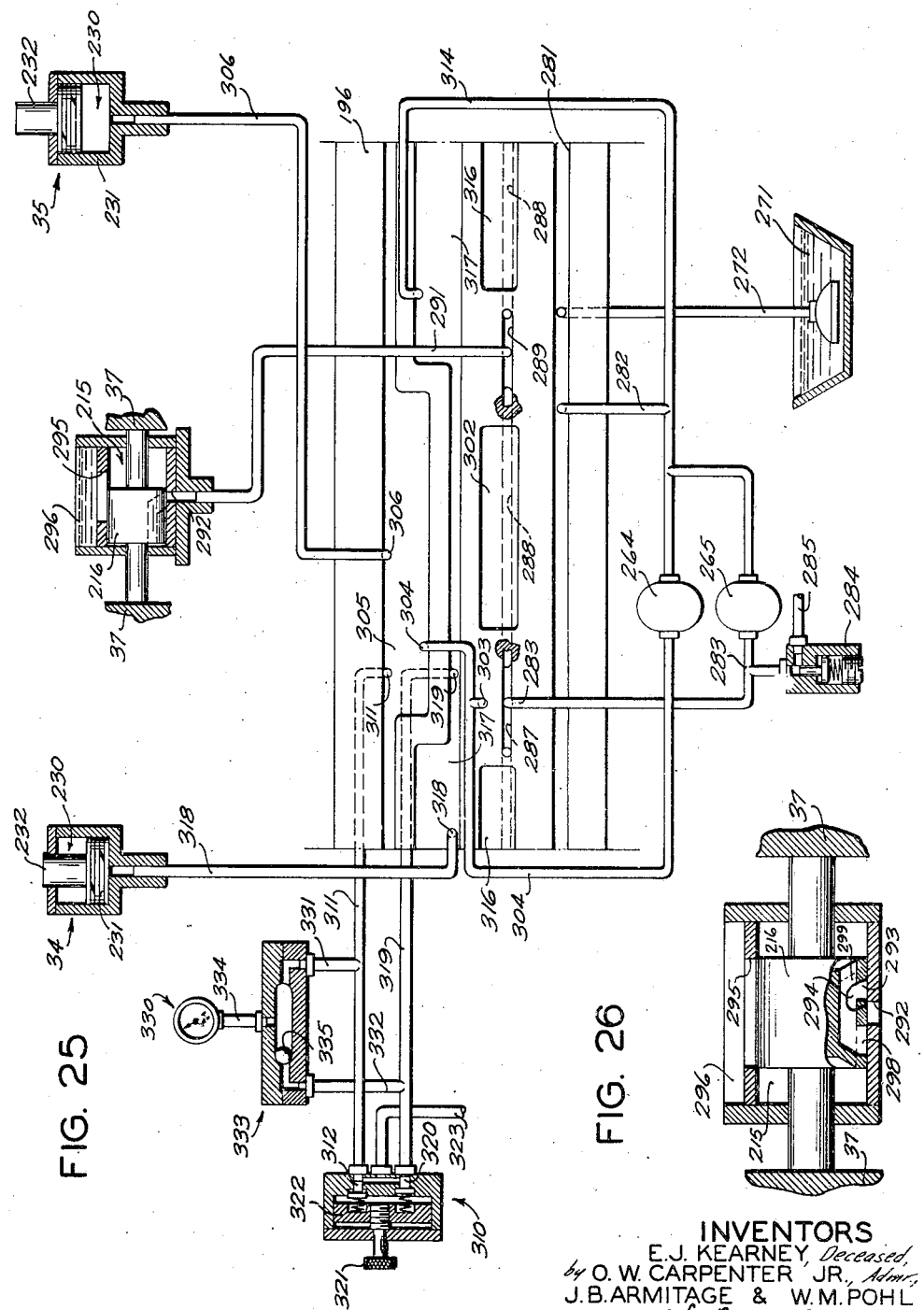

Patented Oct. 25, 1949

2,486,294

UNITED STATES PATENT OFFICE 2,486,294

MACHINE TOOL TRANSMISSION

Edward J. Kearney, deceased, late of Wauwatosa, Wis., by Otto W. Carpenter, Jr., special administrator, Fox Point, Wis., and Joseph B. Armitage, Wauwatosa, Wis., and Walter M. Pohl, Hamden, Conn., assignors to Kearney & Trecker Corporation, West Allis, Wis., a corporation of Wisconsin Original application June 9, 1938, Serial No. 212,704, now Patent No. 2,355,082, dated August 8, 1944. Divided and this application July 6, 1944, Serial No. 543,682

13 Claims. (Cl. 90—20)

This invention relates generally to machine tools, and more particularly to transmission and control apparatus for an automatically operating milling machine.

The present specification constitutes a division of application Serial No. 212,704, filed June 9, 1938, now Patent No. 2,355,082, dated August 8, 1944.

In order to operate a milling machine at maximum production efficiency, successive workpieces must be fed to the milling cutter in such a manner that the delay occurring between the completion of one workpiece and the beginning of the cutting operation on the next workpiece is reduced to the minimum. According to a generally practiced method of operating a standard milling machine, a workpiece is moved at rapid traverse rate from a loading position in direction to approach the cutting zone; then it is fed past the milling cutter in the cutting stroke; then it is withdrawn by moving it past the cutter a second time in the opposite direction at rapid traverse rate to return it to the loading position. To avoid having the finished workpiece gouged by the cutter in returning past it to the loading position, it is the usual practice to stop the cutter spindle at the end of the feed stroke, the cutter remaining stationary until the beginning of the succeeding feed stroke. This method of operation is time-consuming and is otherwise unsatisfactory, the work being scratched by the cutter, in some instances, in moving past it on the return stroke. Because of these shortcomings, it has been generally recognized that milling machines should be so constructed as to provide for leading the finished workpiece away from the cutting zone, without withdrawing it past the cutter.

It is, therefore, a general purpose of the present invention to provide an improved automatically operating milling machine capable of maximum production in machining workpieces.

Another purpose of the invention is to provide a milling machine capable of effecting an automatic cycle of operations so correlated that the cutting action upon successive workpieces is performed in a substantially continuous manner.

Another object is to provide an improved milling machine adapted to move successive workpieces past a rotating milling cutter continuously in the same direction.

Another object is to provide a milling machine having mechanism for moving a plurality of work holding elements successively through a fixed loading and unloading zone.

Another object is to provide an improved hydraulic control system for a machine tool.

Another object is to provide improved automatic clamping mechanism for holding workpieces on a machine tool.

Another object is to provide means for automatically clamping workpieces prior to feeding them toward a milling cutter and automatically unclamping the finished workpieces after the cutting operation.

Another object is to provide fluid operated work clamping apparatus having means for adjusting the clamping pressure.

Another object is to provide a machine tool having hydraulically actuated mechanism carried by a movable member and controlled in response to the position of the movable member.

Another object is to provide a machine tool of the rotary table type having valve means associated with the pivotal support for the table and functioning in response to rotation of the table to control fluid operated mechanism carried by the table.

Another object is to provide hydraulic control mechanism for apparatus carried by a rotating member of a machine tool, including a pump arranged for bodily movement with said rotating member.

According to this invention, an automatic milling machine is arranged to receive workpieces at a loading station some distance from the milling cutter and to advance the workpieces into engagement with the cutter successively in manner to effect a substantially continuous machining operation, the finished workpieces being led away from the cutting zone back to the loading position, without moving across the cutter a second time. For supporting and moving the workpieces, there is provided a continuously rotating table carrying a plurality of movably mounted work holders which cooperate with a cam track in manner to move successive workpieces through the cutting zone along a straight line path. The work holders include clamping means actuated by fluid pressure and controlled in accordance with the angular position of the table. The continuously rotating table is actuated alternately at rapid traverse rate and at feed rate, the rapid traverse movement functioning to quickly advance a workpiece to the cutting zone and to rapidly lead a finished workpiece away from the cutting zone.

The foregoing and other objects of this invention, which will become more fully apparent from the following detailed specification, may be achieved by means of the particular milling machine constituting an exemplifying embodiment of the invention that is depicted in and described in connection with the accompanying drawings, in which:

Figure 4 is a view in horizontal section of part of the driving mechanism, taken generally along the planes represented by the line 4—4 in Figures 3 and 6;

Figure 5 is a detailed view, partly in section, of an element of the driving mechanism taken along the plane represented by the line 5—5 in Figure 4;

Figure 6 is a view largely in vertical section, of part of the driving mechanism taken approximately along the plane represented by the line 6—6 in Figure 4 and showing the table controlling clutches;

Figure 7 is a detailed view in horizontal cross-section of the clutch shifting mechanism, taken along the line 7—7 in Figure 6;

Figure 2:
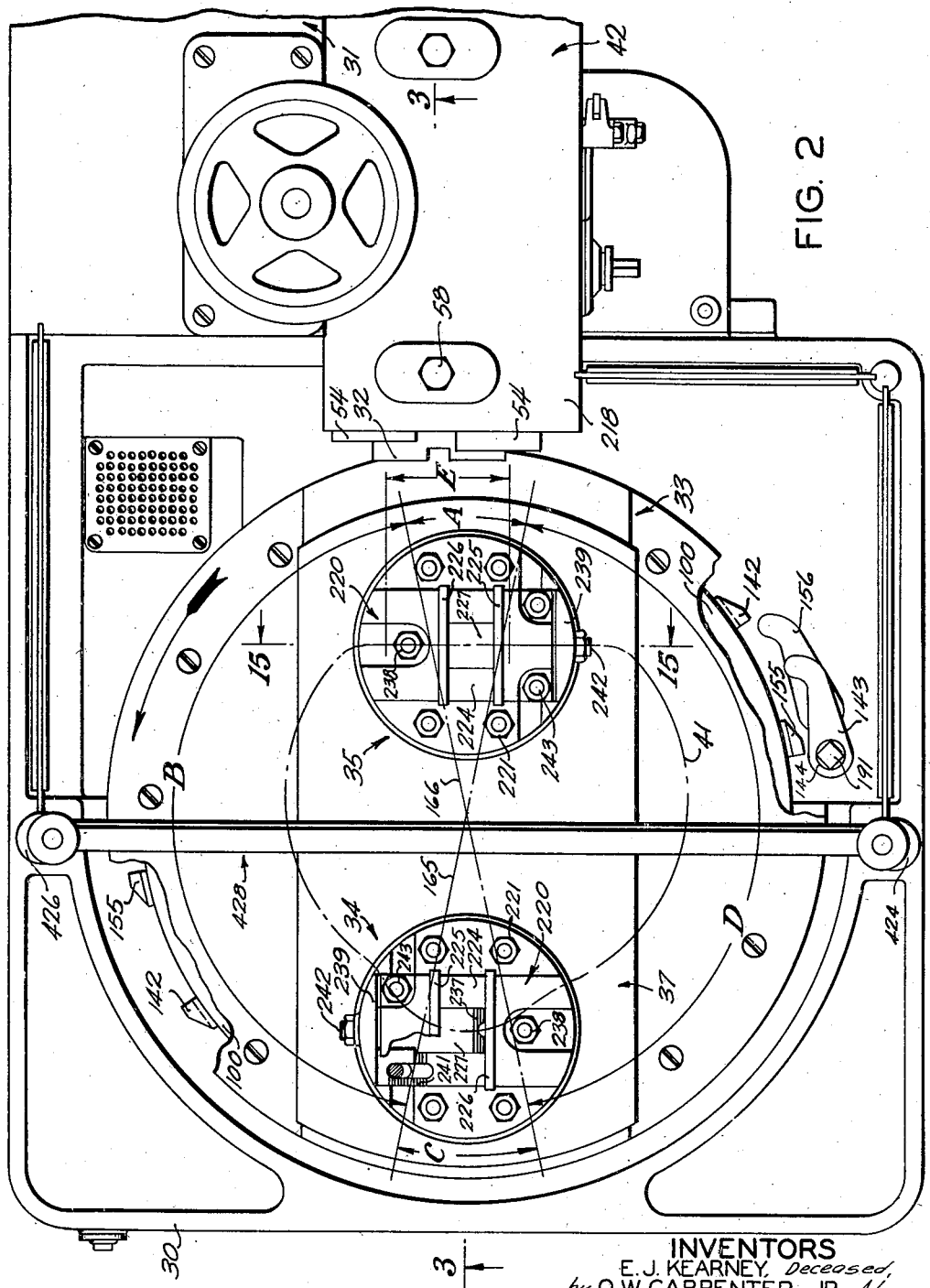
Figure 2 is a partial top plan view of the machine shown in Figure 1, with parts broken away to show the internal mechanism.
Figure 3:
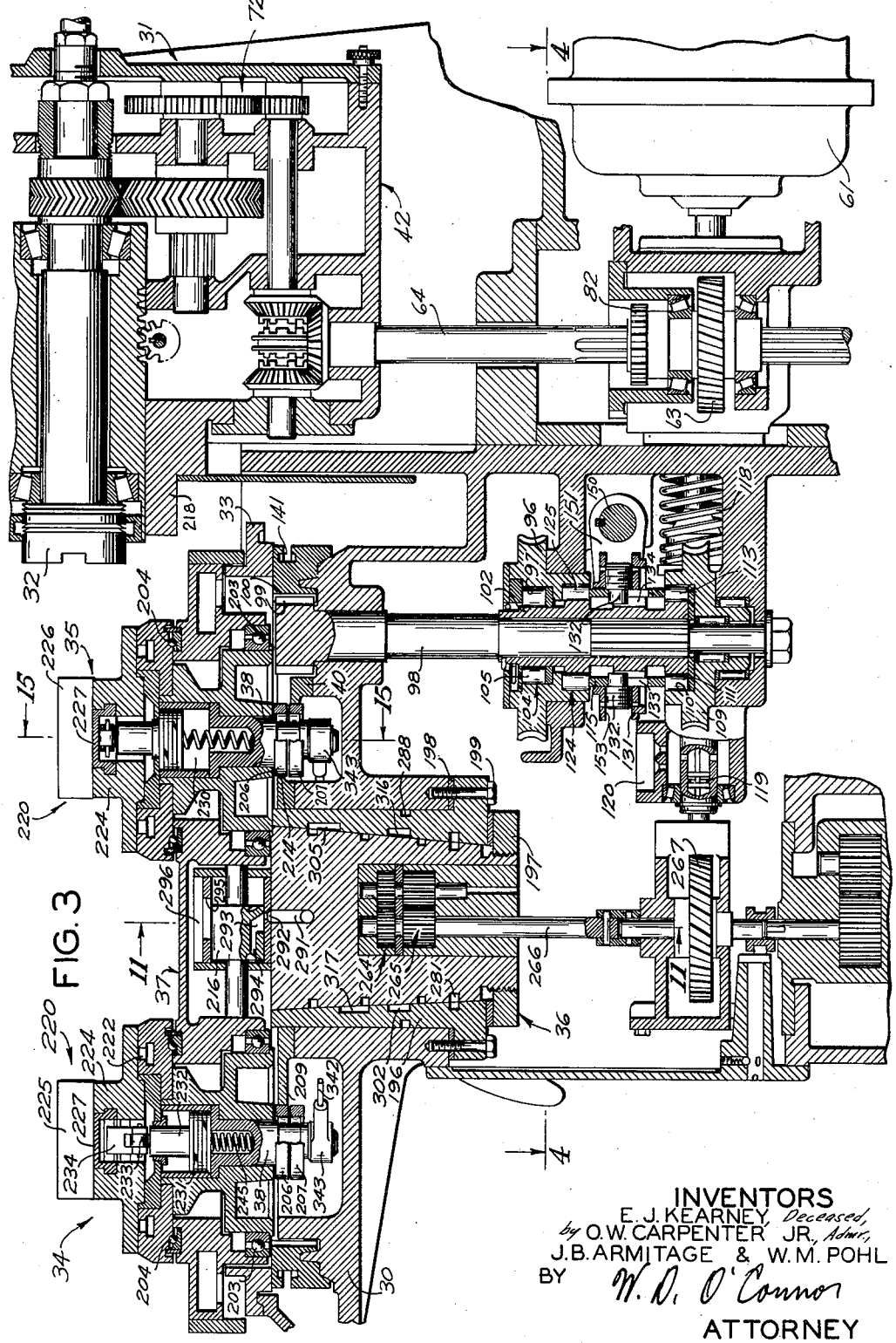
Figure 3 is a view in vertical longitudinal section through the machine, taken approximately along the plane represented by the line 3—3 in Figure 2 and showing the driving mechanism.
Figure 11:
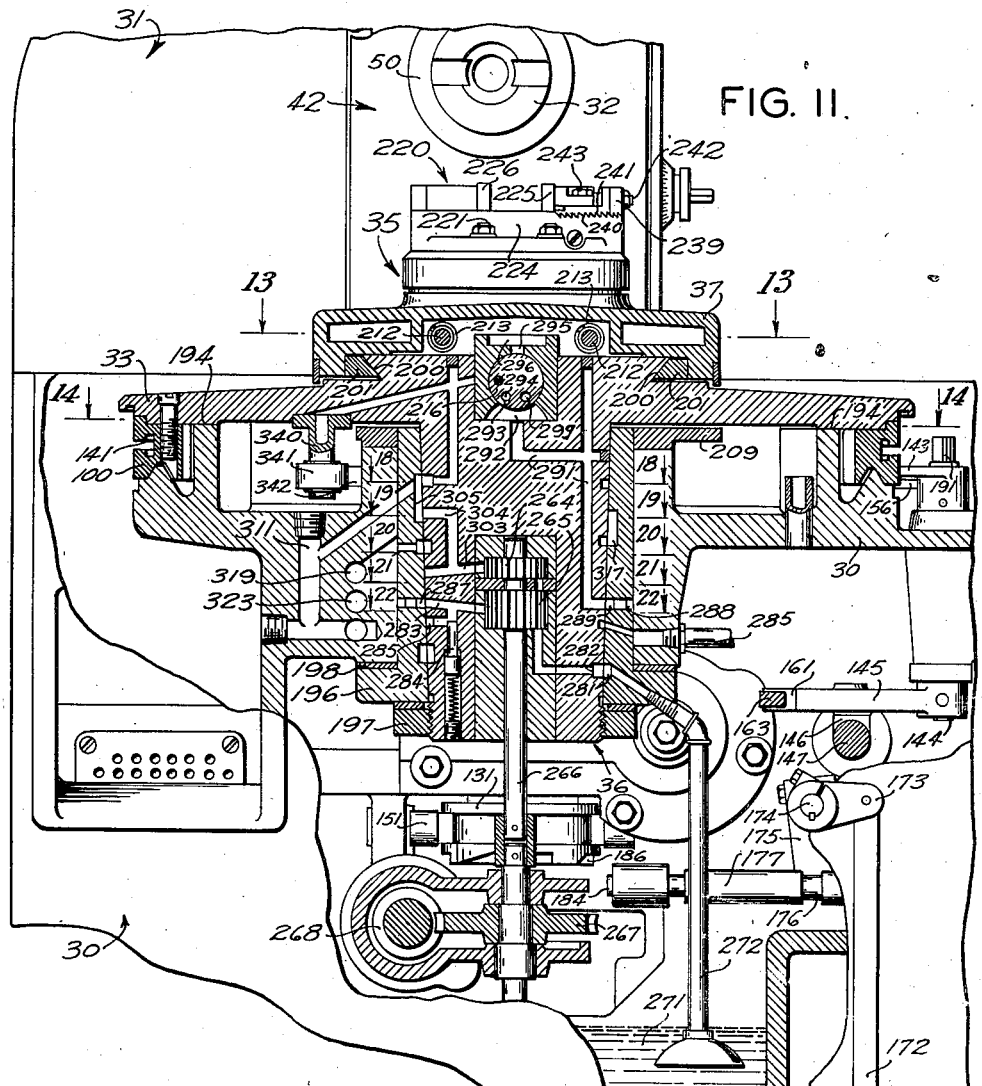
Figure 12:
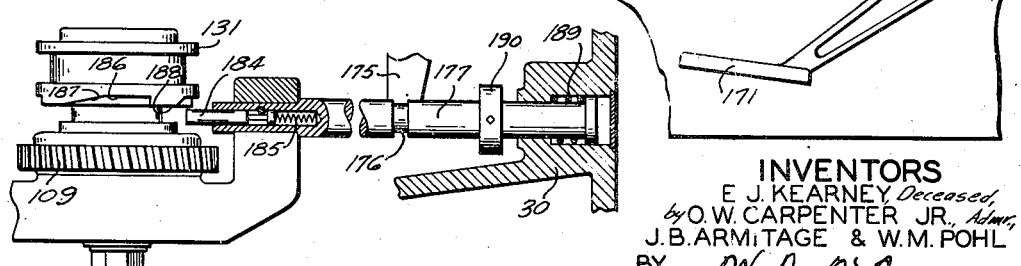
Figure 13:
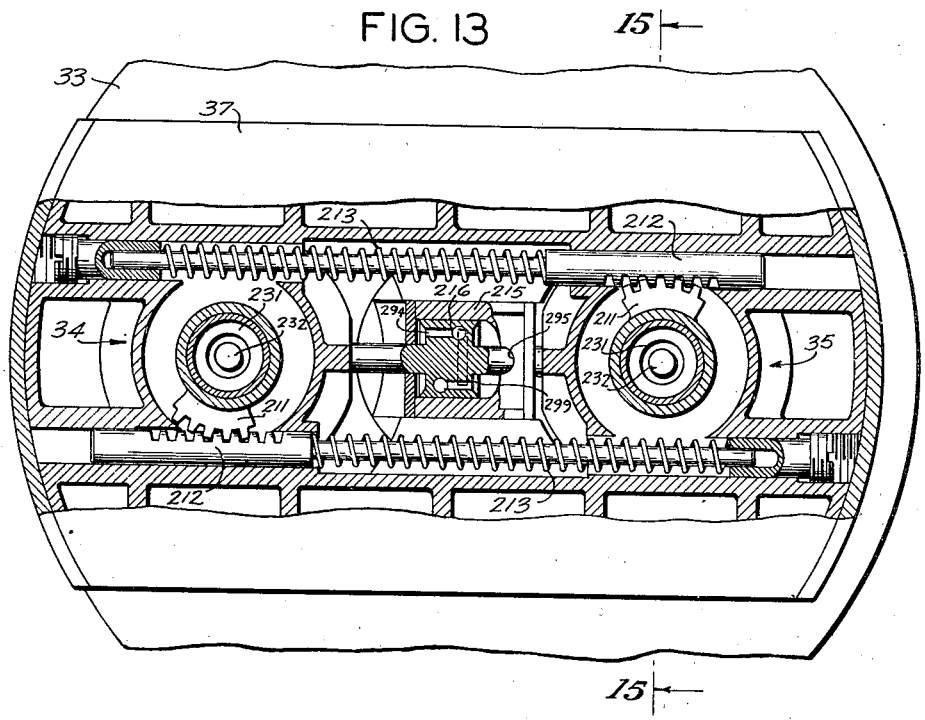
Figure 14:
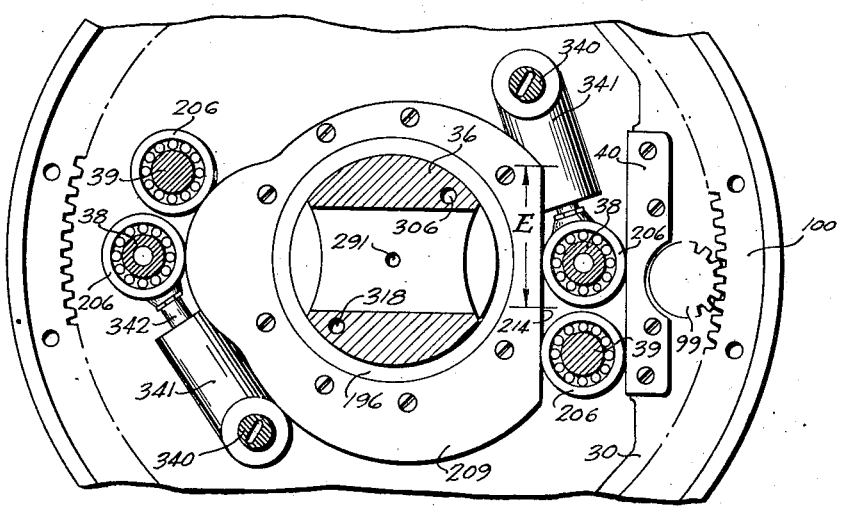
Figure 15:
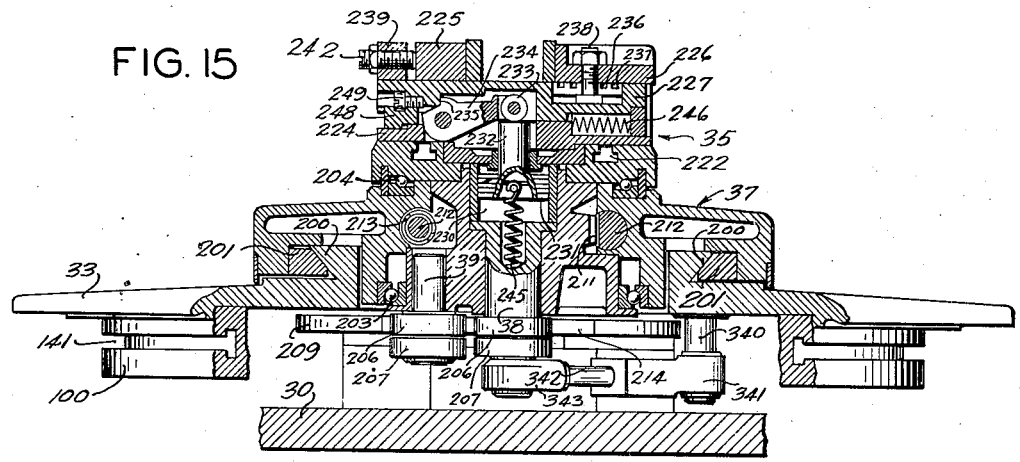
Figure 16:
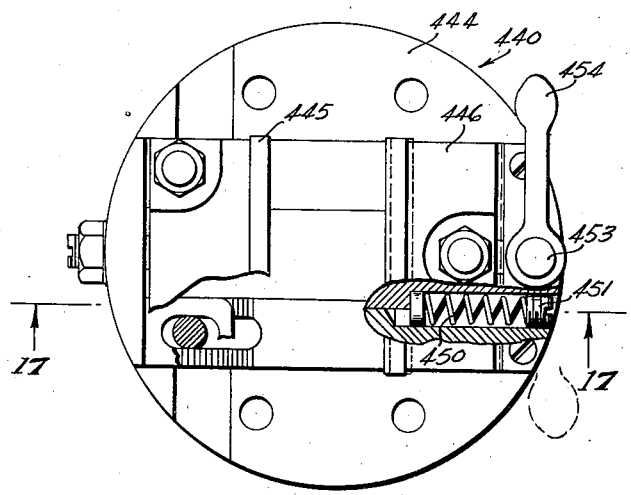
Figure 17:
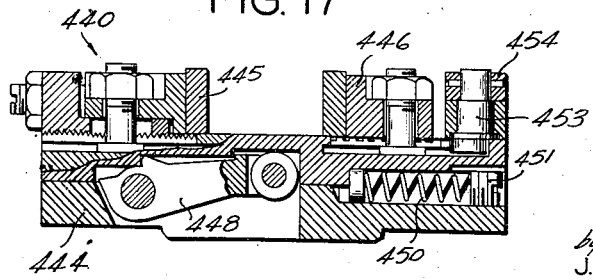

Figures 8, 9 and 10 are fragmentary detailed views in cross-section, taken along the lines 8—8, 9—9, and 10—10, respectively, in Figure 6 and showing elements of the various control clutches;

Figures 8A, 9A and 10A are views similar to Figures 8, 9 and 10, respectively, but showing the clutches shifted to another position;

Figure 11 is a view largely in vertical transverse section through the machine, taken generally along the plane represented by the line 11—11 in Figure 3;

Figure 12 is a detailed fragmentary view in vertical section of selective mechanical control mechanism, taken approximately along the plane represented by the line 12—12 in Figure 4;

Figure 13 is a fragmentary view of the rotary table mechanism taken in horizontal cross-section along the line 13—13 in Figure 11;

Figure 14 is another view in horizontal cross-section of the table mechanism, taken approximately along the plane represented by the line 14—14 in Figure 11 and showing the work guiding cams;

Figure 15 is a view in vertical section through one of the work holding vises, taken along the plane represented by the lines 15—15 in Figures 2, 3 and 13;

Figure 16 is a plan view of a work holding vise constituting a modification of the vise shown mounted on the machine table;

Figure 17 is a view of the modified vise taken in vertical section along the plane represented by the line 17—17 in Figure 16;

Figures 18, 19, 20, 21 and 22 are views in horizontal section through the hydraulic pumps and control valve in the table gudgeon, taken respectively along the correspondingly numbered lines in Figure 11;

Figure 23 is a partly diagrammatic illustration of selective hydraulic clutch controlling mechanism constituting a modification of the mechanical clutch controlling mechanism illustrated in Figure 12;

Figure 24 is a view of the modified clutch controlling mechanism in horizontal section, taken along the plane represented by the line 24—24 in Figure 23;

Figure 25 is a schematic diagram of the automatic hydraulic control circuit for the milling machine; and Figure 26 is an enlarged view of the stabilizing cylinder and piston mechanism shown at the top in Figure 25, the piston having been moved to its central position.

Figure 1:
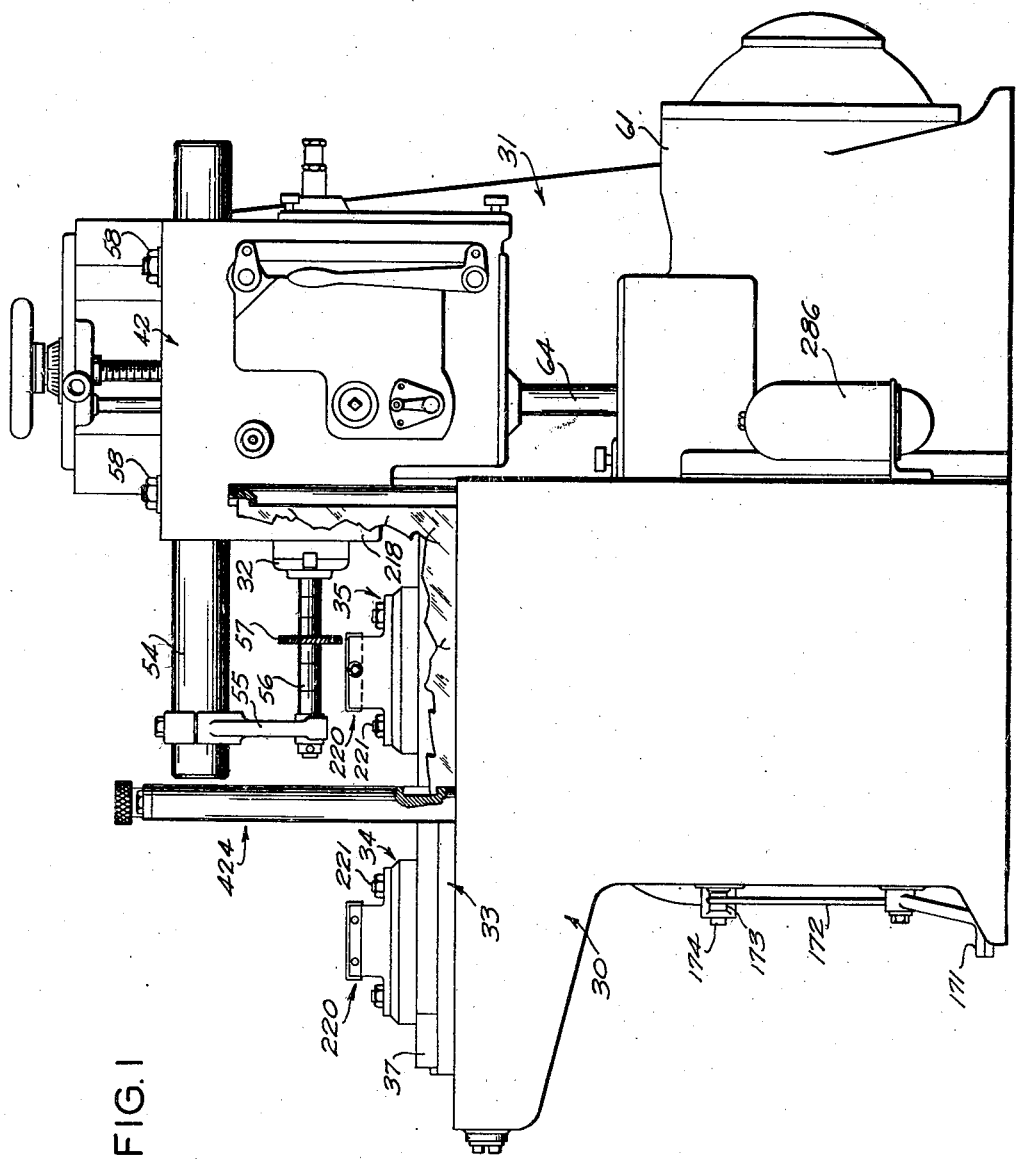
Figure 1 is a view in right side elevation of an automatic milling machine embodying the features of this invention.

Referring more specifically to the drawings, Figures 1 and 2 thereof in particular show the general structure of the continuously operating automatic milling machine constructed in accordance with the principles of this invention that is particularly referred to herein by way of example. As there shown, the machine includes a frame that comprises essentially a bed or base 30 having secured at its back an upstanding spindle supporting column 31, which carries an adjustably mounted tool spindle 32. Rotatably mounted on the top of the bed 30 in front of the column 31 is a horizontally disposed circular work supporting table 33 carrying a pair of work holding fixtures 34 and 35 disposed thereon in diametrically opposed relationship. As shown in Figures 3 and 11, the rotatable table 33 is provided with a depending central gudgeon 36 that is journalled in the top of the bed 30 in manner to constitute a pivotal mounting for the table.

The two work holding fixtures 34 and 35 are supported on the table 33 in manner to be movable radially thereof, by means of a reciprocating cross slide 37 that is slidably mounted diametrically of the table 33, as shown in Figure 2, the fixture being rotatably mounted near the respective ends of the slide. By this arrangement, the work holding fixtures are movably mounted on the table 33 in such manner that when the table is rotated, the fixtures in turning with it may be guided successively through the cutting zone along a predetermined path. For effecting this guiding action, each fixture is provided with two depending studs or arms 38 and 39, which carry rollers at their lower ends disposed to engage with and roll upon the straight surface of a guiding cam 40 mounted in the bed 30, as shown in Figure 14. The cam and rollers cooperate in a manner to cause the work holder to follow a straight line path through the cutting zone as the table is rotated, the fixtures each having a compound motion, by reason of the sliding and turning movements provided by its rotatable mounting on the reciprocating cross slide 37. This provides for feeding workpieces successively in the same direction along the straight line path through the cutting zone and then leading them away without the necessity of withdrawing them past the cutter, each workpiece following the closed path indicated by the dot-dash line 41 in Figure 2.

The cutter supporting spindle 32 is arranged to be adjusted relative to the work table 33, both in vertical direction and transversely of the path of movement of the work holding fixtures through the cutting zone. To provide for the vertical adjustment, the supporting spindle is carried by a spindle head 42, which is slidably mounted on the column 31. The usual overarms 54 are slidably mounted in the upper part of the spindle head 42 in position to carry a depending arbor support 55, in which the end of an arbor 56 carrying a cutter 57 is rotatably supported. Clamping bolts 58 are provided for clamping the overarms 54 in adjusted position in the spindle head.

In operating the machine, the work holding fixture, which happens to be in the forward position or loading station, may be loaded with a workpiece while the table is turning slowly at feed rate. At the end of the feeding stroke, the table is automatically turned at rapid traverse rate to cause the workpiece to approach quickly to a position closely adjacent to the rotating cutter 57, the workpiece being clamped automatically, as the table is turned. The rate of table movement is then automatically changed back to feed rate, in order to feed the workpiece along the straight line path through the cutting zone in operative engagement with the cutter 57.

After the workpiece has passed across the cutter, the table is again automatically moved at rapid traverse rate in the same direction to quickly lead away the finished workpiece and bring it around to the forward position for unloading, a new workpiece in the other fixture meanwhile being moved simultaneously into position for feeding to the cutter. By this arrangement, the work table may be turned continuously in the same direction alternately at rapid traverse rate and at feed rate with the cutter rotating continuously at a predetermined speed to effect substantially continuous milling of successive workpieces.

Power for turning the work table 33 and for rotating the cutter spindle 32 is derived from an electric motor 61, which is mounted in the lower part of the column 31, as best shown in Figure 1. Referring particularly to Figures 3 and 4, the shaft of the motor 61 is operatively connected to a worm 62, which meshes with a horizontally disposed worm wheel 63 that is rotatably mounted in the column 31. The worm wheel 63 is internally splined and slidably engages a splined shaft 64, extending vertically to and journalled in the spindle head 42 in manner to be movable vertically therewith, and constituting part of the transmission train for driving the tool spindle 32, as fully described in the previously mentioned Patent No. 2,355,082.

The transmission train for transmitting power from the motor for turning the work supporting table at a selected feed rate includes a spur gear 82 formed on the hub of the worm wheel 63, which rotates continuously whenever the motor 61 is operating. As shown in Figure 4, the spur gear 82 meshes with a mating gear 83 on a vertical shaft 84 that is provided at its upper end with a removable gear 85 constituting part of a feed rate changing mechanism 86. The removable gear 85 meshes with a complementary removable gear 87 on a parallelly disposed vertical shaft 88, which also carries another removable gear 89 meshing in turn with a removable gear 90 on the upper end of a vertically disposed shaft 91. The removable gears 85, 87, 89, and 90 of the rate changer 86 constitute a pick-off rate changing mechanism generally similar to the speed changer 72 and which may be adjusted by interchanging the gears or substituting other appropriate complementary pairs thereof to provide for turning the table 33 at the required feed rate, a cover plate or door being provided for affording convenient access to the removable gears for changing them.

The vertical shaft 91 of the rate changer is provided with a bevel gear 92, which meshes with a complementary bevel gear 93 on the outer end of a feed drive shaft 94, which is journalled in the bed 30 of the machine and carries at its inner end a feed worm 95. The feed worm 95 meshes irreversibly with a horizontally disposed worm wheel 96 that is rotatably mounted by means of anti-friction bearings in the bed 30 and is provided with an internal cylindrical clutching surface 97.

Disposed concentrically with the worm wheel 96 and journalled in the bed separately therefrom is a vertically disposed table driving shaft 98, which is provided at its upper end with a spur pinion 99 meshing with an internal or ring gear 100 secured beneath the lower outer edge of the table 33 and disposed concentrically with the central gudgeon 36. The table driving shaft 98 has fixed on its lower end a driving collar or bushing 102 that is provided around its top edge with a plurality of sloping radially acting cam surfaces 103 constituting the internal member of an overrunning clutch 104. As best shown in Figures 4 and 6, a plurality of spring-pressed rollers 105 are disposed between the cam surfaces 103 and the internal clutching surface 97 of the worm wheel 96, in such manner that the wheel is adapted to drive the shaft 98, when rotated in one direction, in a well known manner, the clutch 104 functioning to permit the shaft 98 to turn faster than the feed worm wheel 96, when the table is being driven at rapid traverse rate.

For turning the table at rapid traverse rate, there is provided a rapid traverse worm 107 disposed in alignment with the shaft of the motor 61 and operatively connected to the end of the worm 62 by means of an axially movable splined connection or joint 108, as shown in Figure 4. The rapid traverse worm 107 meshes with a cooperating worm wheel 109, which is rotatably mounted by means of anti-friction bearings in the bed 30 below and concentrically with the feed worm wheel 96. The rapid traverse worm wheel 109 is likewise provided with an internal cylindrical clutching surface 110 for engagement by rollers 111, which cooperate with cam surfaces 112 disposed around the lower edge of the driving collar 102, constituting a clutch or ratchet mechanism 113 generally similar to the overrunning feed clutch 104, but arranged for positive selective engagement to drive the table in the same direction at rapid traverse rate with the clutch 104 overrunning. To effect selective operation of the clutch 113, the rollers 111 are engaged by depending fingers of bars constituting a spacing cage 114 formed on the lower end of a clutch shifting sleeve 115 that is disposed concentric with and encircles the driving collar 102. This arrangement permits positive selective disengagement of the clutch 113 or positive engagement thereof for operating the table at rapid traverse rate.

Inasmuch as the table 33 and the work holding fixtures carried thereby constitute a rotating element having considerable inertia, it is desirable to provide means for absorbing the shock incurred when the rapid traverse clutch 113 is engaged suddenly. To this end, the rapid traversing worm 107 is mounted in manner to be free to slide endwise by reason of the splined connection 108, a spring 118 being provided for normally retaining the worm in central position, relative to the worm wheel 109. To prevent the spring 118 from returning the worm 107 beyond its normal position or at excessive speed after the table has been accelerated, a dashpot 119 is provided at the other end of the worm, as shown in Figures 3 and 4. The dashpot functions to trap lubricating oil supplied from a reservoir 120 and to expel it through restricted openings in such manner as to cushion the return movement of the worm.

In order to conserve time during the cutting cycle, it is desirable to have the workpiece approach as close as possible to the cutter at rapid traverse rate and then automatically change the rate of table movement to feed rate for feeding the work into engagement with the cutter without delay. The promptness with which the workpiece may be fed into engagement with the rotating cutter depends upon the accuracy and certainty with which the change from movement at rapid traverse rate to movement at feed rate may be made, since with the change being made close to the cutter any inaccurracy or overrunning of the table might result in the workpiece accidentally engaging the cutter at rapid traverse rate, thereby causing damage to the machine.

To provide for accurately and positively changing the rate of movement from rapid traverse to feed rate, the driving mechanism is equipped with a synchronizing or decelerating positive roller clutch or ratchet mechanism 124 cooperating with the feed worm wheel 96 and generally similar in structure to the rapid traverse clutch 113, but disposed to operate in the opposite direction. The synchronizing or decelerating clutch 124 includes rollers 125 disposed to cooperate with cam surfaces 126, formed on an intermediate part of the driving collar 102, in manner to be forced thereby into engagement with an internal cylindrical clutching surface 127 in the lower part of the feed rate worm wheel 96. For engaging or disengaging the synchronizing clutch 124, a spacing cage 128 similar to the cage 114 is provided on the upper end of the clutch actuating sleeve 115, the arrangement being such that when the sleeve 115 is turned to disengage the rapid traverse clutch 113, it is moved in the direction to engage the synchronizing clutch 124, and since the clutches act oppositely, they may thus be engaged alternatively.

When the synchronizing clutch 124 is engaged, it positively prevents rotation of the table driving shaft 98 at a rate faster than the rate that is established by the feed worm wheel 96. Since the worm wheel 96 and its cooperating feed worm 95 constitute an irreversible drive mechanism, the inertial forces of the rotating table 33 are exerted through the synchronizing clutch 124 upon the feed worm wheel 96 and against the worm 95 in a manner to quickly and positively check the rotative velocity of the table 33 and reduce it to the rate of movement corresponding to the feed rate at which the feed worm wheel 96 is turning, as determined by the feed rate changer 86. As the table driving torque is then exerted through the feed rate overrunning clutch 104, the two roller clutches acting in opposite directions tend to lock the feed worm wheel 96 to the shaft 98 with a positive grip.

The fact that the feed rate driving worm and worm wheel mechanism is irreversible and that it is positively coupled to the table by the overrunning clutch and the synchronizing clutch, makes it possible to operate the machine in a manner to effect climb cutting of workpieces without danger of the table being pulled ahead by the rotating cutter at a rate faster than the predetermined feed rate.

Circumferential shifting movement of the clutch shifting sleeve 115 relative to the driving collar 102 is effected by means of an axially movable shifting collar 131, which encircles the clutch sleeve, as shown in Figures 3, 6, and 7, and is provided with diametrically opposed inwardly projecting pins 132. As shown in Figure 7, the pins 132 extend through slots 133 in the clutch sleeve 115 into axially disposed slots 134 in the driving collar 102, the arrangement being such that the shifting collar 131 is caused to rotate with the driving collar 102 and the shaft 98, but is free to be moved axially relative thereto along the slots 134. As shown in Figure 6, the slots 133 in the clutch sleeve 115 are angularly disposed or pitched in such manner that when the shifting collar 131 moves the pins 132 along the axially disposed slots 134 in the driving collar 102 from end to end thereof, the clutch sleeve 113 is caused to turn relative to the driving collar through a sufficient angle to disengage one of the roller clutches and to engage the other clutch, thereby providing a convenient and effective control mechanism for the roller clutches.

When the shifting collar 131 is moved to its upper position, as shown in Figure 6, the clutch shifting sleeve 115 is turned in manner to disengage the rapid traverse driving clutch 113, the spacing cage 114 on the lower end thereof moving the clutch rollers 111 into the deep portion of the cam grooves 112, as shown in Figure 10. With the rapid traverse driving clutch disengaged, the table is driven at feed rate, by means of the overrunning feed rate clutch 104, a spring 136 acting upon a spacing cage 137 to force the clutch rollers 105 into wedging engagement between the cam surfaces 103 on the driving collar and the cylindrical clutching surface 97 within the feed worm 96 to effect a driving connection in the manner indicated in Figure 8.

If it is desired to operate the table at rapid traverse rate, the shifting collar 131 is moved downward, thereby causing the clutch sleeve 115 to turn counter-clockwise, relative to the driving collar 102, by reason of the action of the pins 132 in the angular slots 133 and the vertical slots 134. This results in moving the rollers 111 of the rapid traverse clutch into wedging engagement between the cam faces 112 and the clutch surface 110, as shown in Figure 10A. The rollers 111 then effect a connection between the rapid traverse worm wheel 109 and the table driving shaft 98, causing the shaft to rotate faster than the feed worm wheel 96, with the result that the overrunning clutch 104 becomes disconnected or overruns with its rollers disengaged, as indicated in Figure 8A.

In effecting a sudden change in the rate of movement of the table from rapid traverse to feed rate at an accurately predetermined position, the clutch sleeve 115 is caused to turn clockwise by moving the shifting collar 131 upward to the position shown in Figures 3 and 6, thereby disengaging the rapid traverse clutch 113, as shown in Figure 10 and immediately effecting engagement of the synchronizing clutch 124, as shown in Figure 9. As previously explained, this quickly reduces the rate of movement of the table to the speed at which the overrunning feed clutch 104 engages, whereupon the movement of the table is continued at the predetermined feed rate.

In order that the changes in the rate of movement of the table may be caused to occur automatically at accurately predetermined positions, automatic trip mechanism arranged to be actuated by trip dogs carried by the rotary table is provided. As may be seen in Figures 2, 3 and 11, the ring gear 100 secured beneath the table is provided on its periphery with a circumferentially disposed T-slot 141, adapted to receive trip dogs. As shown in Figure 2, a trip dog 142 in the T-slot 141 is adapted to engage a trip arm 143 mounted on the upper end of a trip shaft 144 that is vertically disposed at its lower end with an arm 145, which carries a shoe 146 engaging a notch in a horizontally disposed push rod 147 slidably mounted in the machine bed 30, as shown in Figure 4. The push rod 147 is provided at its other end with a notch 148, which engages the upper end of an arm 149 on a shaft 150, as shown in Figure 5. The shaft 150 is rotatably mounted in the machine bed 30, as shown in Figures 3 and 4, and is provided at its inner end with a shifting fork 151 carrying shoes 152, which engage a groove 153 in the periphery of the clutch shifting collar 131, as shown in Figures 6 and 7. The shoes 152 engage the groove 153 in manner to permit the collar to rotate with the clutch mechanism by the shaft 98, and upon turning movement of the shaft 150, they operate to move the shifting collar vertically.

The arrangement of the automatic trip mechanism is such that when the dog 142 engages the arm 143 and forces it outward, the shaft 144 is turned in manner to effect movement of the shifting collar 131 to its upper position, thereby disengaging the rapid traverse driving clutch 113 and engaging the synchronizing clutch 124 in manner to cause the rate of movement of the table to be reduced to feed rate substantially instaneously. For automatically effecting engagement of the rapid traverse drive, another dog 155, provided in the T-slot 141, is operative to engage a trip lever 156 mounted on the upper end of a vertical shaft 157, shown in Figure 4, and provided with a pinion 158 meshing with a gear segment 159 fixed on the shaft 144, the arrangement being such that the trip arm 156, when engaged and moved outward by the dog 155, turns the shaft 144 in direction opposite to that in which it is turned by outward movement of the arm 143, thereby causing the shifting collar 131 to be moved downward to disengage the synchronizing clutch 124 and to engage the rapid traverse rate driving clutch 113. As shown in Figure 4, the arm 145 is provided at its outer end with angularly disposed cam faces 160 constituting a detent point 161 that is engaged by a roller 162 on the end of a pivoted arm 163. The arm 163 is urged by a spring 164 in direction causing the roller 162 to act on one or the other of the cam faces 160, in manner to force the detent arm 145 in one or the other direction to positively engage a selected one of the roller clutches. By this arrangement, any wear which occurs in the clutches is automatically taken up by the spring 164. Further, the spring 164 effects engagement of one or the other clutch as soon as the arm 145 has been moved by the trip arm 143 or the trip arm 156 a sufficient distance to move the centrally disposed detent point 161 at the junction of the cam faces 160, beneath the roller 162, the roller 162 then being forced against the other cam face by the spring 164, causing the arm 145 to quickly complete its movement.

Because of the action of the synchronizing clutch 124 in quickly reducing the rate of movement of the table, the feed dog 142 may be set at such position that a workpiece held in the work holder 35, for instance, may be caused to approach at rapid traverse rate to a position quite close to the cutter before the rate of movement is changed to feed rate. By this arrangement, loss of time in moving the table at feed rate for a considerable distance, before the work engages the cutter, is avoided. Since the two work holders 34 and 35 are disposed at opposite ends of the cross slide, the table is provided with two sets of trip dogs 142 and 155, disposed at diametrically opposed positions thereon, as shown in Figure 2. The accurate action of the trip mechanism in cooperation with the positively actuated roller clutches constitutes, in effect, an indexing operation definitely positioning each successive workpiece relative to the cutter.

The angular distances through which the table is turned at feed rate and at rapid traverse rate, respectively, with the trip dogs in the position shown, are set off by the dot-dash lines 165 and 166 in Figure 2. As there indicated, the table is turned through the angle A at feed rate in moving the forward work holder through the loading position, and is then turned at rapid traverse rate through the angle B in moving the loaded work holder up to the feeding position adjacent to the cutter. In feeding the workpiece across the cutter, the table turns through the angle C at feed rate and, after the cutting operation is completed, the table is moved at rapid traverse rate through the angle D to lead the finished workpiece away from the cutting zone and bring it around to the forward station for unloading.

Since the operations of unloading the finished workpiece and replacing it with a fresh workpiece are performed by the machine attendant during the time that another workpiece is being fed through the cutting zone, it sometimes happens that the time taken by the table in moving through the cutting stroke is not sufficient for completion of the loading operation. In this event, the machine attendant may prolong the feeding movement and prevent or delay shifting to the rapid traverse rate of movement, as long as may be necessary to complete the loading operation by merely depressing a pedal 171, pivotally mounted on the front of the machine, as shown in Figures 1 and 11.

The pedal 171 is connected by a link 172 to an arm 173 mounted on a shaft 174, which extends horizontally into the machine bed 30, as shown in Figure 4. The shaft 174 carries a depending arm 175, the lower end of which engages a notch 176 in a plunger 177 that is slidably mounted in the bed 30, as shown in Figures 4, 11, and 12. When the pedal 171 is depressed, the shaft 174 is turned clockwise, as seen in Figure 11, and the plunger 177 is moved to the left beneath the shifting collar 131, in manner to prevent it from being shifted downward from the feed rate position to the rapid traverse rate position, thereby restraining the mechanism from operating at rapid traverse rate. Since the final movement of the shifting collar 131 is effected by the spring 164 acting on the detent point 161 of the arm 145, interference with the movement of the shifting collar by the plunger 177 does not obstruct the action of the trip dogs 142 and 155. To this end, the trip mechanism may be so adjusted that the shifting collar 131 is not moved a sufficient distance to shift the clutches until after the detent point 161 passes the spring urged roller 162. For this purpose, the arm 149 which is engaged by the push rod 147, as shown in Figure 5, is rotatably mounted on the shaft 150 and arranged to be engaged by set screws 181 and 182 carried in a bifurcated bracket 183 keyed on the shaft 150, the arrangement being such that the angular relationship of the arm 149 and the shaft 150 may be adjusted to effect precisely the desired action of the trip mechanism.

The inner or forward end of the plunger 177 is provided with a spring urged rotatable bolt or roller 184 that enters beneath the shifting collar 131, as shown in Figure 12, when the pedal is depressed. In the event that the collar 131 is being shifted toward, or has already been shifted into rapid traverse position before the pedal is depressed, the roller 184 may not pass beneath the collar, but may first be forced against it yieldingly, by means of a spring 185, the end of the roller engaging the periphery of the collar. As the collar 131 turns with the table driving shaft, the roller will then be forced by the spring into one or another of a plurality of cam notches 186 in the lower edge of the collar, each of which presents an inclined face 187 adapted to engage the roller 184 and coact with it in manner to lift the collar, thereby shifting the clutches from rapid traverse position to feed position. The end of the roller 184 then passes farther beneath the collar 131 into rolling engagement with a horizontal circular face 188 thereof, as shown in Figure 12, thereby retaining the collar in its upper or feed position. After the loading operation has been completed, the attendant releases the pedal 171, and a spring 189 on the end of the plunger 177 opposite from the clutch mechanism withdraws the roller from beneath the collar 131, thereby permitting the detent spring 164 to complete the clutch shifting operation previously initiated to engage the rapid traverse drive, a collar 190 being provided on the plunger 177 to limit its outward movement, as shown in Figure 4. The rapid traverse movement of the table then continues with the workpiece approaching the cutter at rapid traverse rate until one of the feed dogs 142 engages the feed trip arm 143 and shifts the collar 131 upward to feed position. If it is desired to effect shifting of the feed and rapid traverse clutch mechanism manually, a hand lever (not shown) may be applied to the squared upper end 191 of the control shaft 144, shown in Figures 2 and 11, to turn it from either position to the other.

Referring particularly to Figures 3 and 11, the work carrying table 33 is rigidly supported for rotation in a horizontal plane by means of bearing surfaces 194 disposed on the top of the bed 30 in position to support the outer edges of the table closely adjacent to the driving ring gear 109. The central gudgeon 36, which pivotally supports the table is downwardly tapered in shape and is rotatably journalled in a complementary tapered pivot bearing or sleeve 196, adjustably mounted in the bed 30 of the machine. To insure accurate and rigid support of the table in its pivot bearing, the lower end of the tapered gudgeon 36 is provided with a retaining nut 197, which may be turned to hold the gudgeon in snug engagement with the tapered bearing sleeve 196, the sleeve being adjustably positioned in the bed 30 by means of shims 198 for establishing the proper fit with the gudgeon and held in adjusted position by bolts 199.

As may best be seen in Figures 11 and 15, the work holder carrying slide 37 is mounted for movement diametrically of the table 33, by means of ways 200 on the top of the table, which are engaged by gibs 201 on the slide to constitute a sliding bearing or connection of well known type. As best shown in Figure 3, each of the work holding fixtures 34 and 35 is rotatably mounted near one end of the slide 37, by means of vertically spaced anti-friction bearings 203 and 204 in such manner that it is rigidly supported on the slide and yet is free to be turned about its vertical pivot axis. The studs 38 and 39, depending from each of the fixtures 34 and 35, are each provided at the lower end with two superimposed rollers 206 and 207 mounted on ball bearings and disposed to engage the cam surfaces for guiding the work holding fixtures through the cutting zone. Since the rollers engage the guiding cams with rolling action, the amount of wear on the cams is reduced to a minimum, and consequently, the accuracy of the cams in guiding the work is less likely to be impaired than would be the case if sliding cam followers were used.

As may best be seen in Figure 3, the lower rollers 207 on both studs 38 and 39 engage and roll upon the straight line guiding cam 40, while the work holding fixture is being moved through the cutting zone. Although the cam 40 is shaped to guide the work holding fixture along a straight line, it will be understood that the work holders may be moved along a curved line or a line having any other shape to effect cutting of the work according to any predetermined configuration by substituting a cam track of the required shape. As best seen in Figures 14 and 15, the upper rollers 206 engage and roll upon the periphery of a central cam 209, which completely encircles the gudgeon bearing 196 and constitutes a cam track for guiding the work holding fixtures as they are being moved from the cutting zone through the loading station and back to the cutting zone.

The cam rollers on the studs 38 are disposed concentrically with the bearings 203 and 204, which pivotally support the work holding fixture, and they are maintained in contact with the surface of the cam 209 at all times, by reason of the fact that the cam is shaped to provide a constant diameter at all angular positions. However, the studs 39 are not constrained in this manner to any predetermined path of movement, since the work holders may be pivoted about the axes of the studs 38. In order to retain the upper rollers 206 on the studs 39 in contact with the cam 209, each of the work supporting fixtures 34 and 35 is provided with a gear segment 211, as shown in Figure 13, which meshes with rack teeth on a rod 212 mounted for endwise sliding movement in the slide 37 and provided with a compression spring 213 arranged to exert force in direction tending to turn the work holders clockwise, as seen in Figures 13 and 14, to force the rollers 206 on the studs 39 into engagement with the cam 209.

In moving the workpiece through the cutting zone, it is necessary that the work holding fixture be supported as rigidly as possible to prevent any movement which might result in inaccuracies or vibration of the workpiece. For this purpose, the inner cam 209 is provided with a straight line portion 214, as shown in Figure 14, disposed parallel with and slightly above the straight line guiding cam 40 and in such position that as the lower rollers 207 roll along the cam 40, the upper rollers 206 engage and roll along the straight portion 214 of cam 209, as shown in Figure 3, in manner to positively guide the work holder along the straight line path past the cutter 57. The rollers 206 and 207 on the studs 38 and 39 are wedged between the cam surfaces 40 and 214 in manner to effect rigid support of the work holding fixtures, and in addition a hydraulic cylinder 215 provided with a piston 216 is mounted in the central part of the table and is operative to exert a force in the direction tending to move the slide 37 to the right, as seen in Figure 3, to insure firm engagement with the straight line guiding cam 40 and to prevent any slight tilting movement or vibration of the work holder which might otherwise occur, by reason of clearances in the bearings supporting the work fixture and the rollers.

Since the work holding fixture does not move along a straight line until after the rollers on both the stud 38 and the stud 39 engage the straight cams 40 and 214, the length of the straight line path of movement is shorter than the straight portion 214 of the cam 209 by an amount equal to the distance between the centers of the studs. The length of the straight line path of movement is indicated in Figures 2 and 14 by the dimension E, and since the work holding fixture is mounted concentric with the leading stud 38, the straight line motion does not begin until the work holder has moved along the cam 40 far enough to bring the rollers 207 on the trailing stud 39 into engagement with the straight line cam 40. Consequently, the straight line path of movement is offset somewhat relative to a vertical plane longitudinally of the machine through the center of the rotating table, as appears in Figures 2 and 14. In order that advantage may be taken of the full length of the straight line movement, the cutter spindle 32 is correspondingly offset relative to the center of the table 33, as best shown in Figure 2. Further, in order that the spindle 32 may be positioned to rigidly support the cutter 51 as near as possible to the straight line cutting zone E, the spindle carrying head 42 is provided with a forwardly projecting or overhanging supporting portion 218, as shown in Figures 1, 2, and 3, which is disposed to overlie the outer edge of the rotating table 33, in order to support the cutter spindle at a position as near as possible to the work.

Each of the work holding fixtures 34 and 35 is arranged to carry a suitable work clamping device such as a vise 220. As shown in Figures 1, 2, 3, 11 and 15, the vises 220 are mounted on the respective work holding fixtures in manner to be adjusted angularly thereon and are secured in adjusted position by means of bolts 221, the heads of which engage circular T-slots 222 in the upper surfaces of the fixtures. Referring particularly to Figures 2, 3, and 15, each of the vises includes a body portion 224 carrying a fixed jaw 225 and a slidable jaw 226 arranged for relative cooperating movement to effect clamping of workpieces therebetween, the movable jaw 226 being carried by a sliding member or slide 227.

In operating the machine a workpiece is placed between the fixed jaw and the movable jaw while the fixture is in the loading position, and then as it moves toward the cutting zone, the work is automatically clamped by hydraulic pressure means. For this purpose, each work holding fixture is provided with a central vertically disposed hydraulic cylinder 230 provided with a piston 231 having an upwardly extending piston rod 232, which engages a roller 233 on one end of a pivoted lever 234 mounted in the vise. When pressure is admitted to the cylinder 230 to move the piston 231 upward, the piston rod 232 pivots the lever 234 counter-clockwise, as appears in Figure 15, causing a lug 235 thereon to engage a notch in the slide 227 in manner to move the jaw 226 toward the jaw 225.

The relative positions of the jaws 225 and 226 may be adjusted to adapt them to clamp a workpiece of predetermined size. This adjustment may be effected by moving the jaw 226 relative to the slide 227 to engage depending teeth 236 on the jaw in any one of a plurality of notches 237 in the slide 227, as shown in Figure 15, to constitute a rough adjustment, the jaw being retained on the slide by tightening a bolt 238. To provide for effecting a fine adjustment, the fixed jaw 225 is carried by a bracket 239 provided on its lower face with serrations 240, which engage complementary serrations 241 in the upper face of the vise body 224, as shown in Figures 2 and 11. The bracket 239 is provided with an adjusting screw 242, which engages the back of the jaw member 225 for moving it precisely to the desired position, bolts 243 being provided for clamping both the jaw 225 and the bracket 239 to the vise body 224 in the adjusted position.

When the clamping pressure in the cylinder 230 is released, a tension spring 245 draws the piston 231 downward in the cylinder 230, and a spring 246 in the vise body moves the sliding member 227 in direction to withdraw the movable jaw 226 from the stationary jaw 225. When relatively small workpieces are being machined, it is desirable to limit the extent of opening of the jaws to prevent the workpieces from dropping into the opening between them. For this purpose, a stop member 248 (Figure 15) is adjustably fastened to the sliding member 227 by screws 249, in manner to engage the vise body 224 when the jaws have been opened to the predetermined position. In the event that a clamping or holding arrangement other than an automatically actuated vise is to be utilized, a plate or the like may be secured to the top of the work holding fixture in position to retain the piston rod 232 and the piston 231 in retracted position within the cylinder 230, the hydraulic pressure being admitted as usual to the cylinder without effecting movement of the piston.

Hydraulic pressure for actuating the stabilizing piston 216 and the vise clamping pistons 231 is derived from pumps 264 and 265, which are mounted in and carried bodily by the gudgeon 36. By this arrangement, the hydraulic pressure may be conducted to the cylinders by means of comparatively short passageways, and the control of the system may be effected by a valve mechanism formed in the gudgeon 36 and its cooperating bearing sleeve 196, the valve being operative to effect movement of the actuating pistons in accordance with the angular position of the table 33. As may be seen in Figures 3, 11, 21 and 22, the pumps 264 and 265 are of the gear type and are mounted one above the other with the driving gears thereof disposed in alignment and concentrically with the axis of rotation of the table supporting gudgeon, the arrangement being such that a shaft 266, connected with both of the driving gears, extends concentrically through the gudgeon 36 and depends therefrom to provide a driving connection for actuating both pumps.

The pump driving shaft 266 is coupled to a horizontally disposed worm wheel 267 that is journalled in the bed 30 in meshing engagement with a driving worm 268, as appears in Figure 4. The pump driving worm 268 is operatively connected for rotation with the rapid traverse rate driving worm 107 by means of a key 269 carried by the body of the dashpot 119, the connection being such that both the pump 264 and the pump 265 are driven whenever the motor 61 is operating. As shown in Figure 11, the pumps 264 and 265 are supplied with actuating liquid such as ordinary lubricating oil, from a sump 271 through a suction pipe 272, the oil from the pumps being distributed under pressure to the various parts of the machine in well known manner for effecting lubrication of the mechanism in addition to serving as actuating liquid for the hydraulic cylinders.

When the motor is operating and the pumps 264 and 265 are functioning, as previously mentioned with reference to the hydraulic apparatus shown in Figure 11, the oil drawn from the sump 271 through the pipe 272 passes into an annular groove 281 in the bearing sleeve 196, which communicates at all times with a passageway 282 in the gudgeon 36 that leads to the pumps. From the pump 265, the oil is forced under pressure through a passageway 283 (Figures 11 and 22) leading to a pressure regulating or relief valve 284. Oil in excess of that required to maintain a predetermined operating pressure in the passageway 283 escapes through the relief valve 284 into a passageway 285, which leads to an oil filter 286 (Figure 1) and thence into the lubricating system of the machine.

When the rotary table 33 is in the position shown in the drawings, with the work holding fixture 35 passing through the cutting zone E, the passageway 283 from the pump 265 is positioned as shown in Figures 11 and 22 to communicate with a groove 287 in the sleeve 196, which communicates through passageways 288 with a similar groove 289 at a diametrically opposite position. The groove 289 communicates with a passageway 291 in the gudgeon 36 that passes upwardly through the gudgeon to the stabilizing cylinder 215.

As appears in Figure 3, pressure exerted through the passageway 291 enters a narrow groove 292 in the bottom of the cylinder 215, which communicates with a port 293 in the piston 216 connecting with a longitudinal passageway 294 therein through which the oil flows to the left end of the cylinder and exerts pressure upon the piston 216 in direction to move it to the right, in manner to force the slide 37 to the right, as previously explained, for firmly engaging the cam following rollers on the fixture 35 with the straight line guiding cam 40. Oil from the right end of the cylinder 215 escapes through a port 295 in the top of the cylinder into a reservoir 296, which serves to maintain the cylinder full of oil at all times and prevents the entrance of air into the system, the oil which overflows from the reservoir 296 returning to the sump 271.

The hydraulic system is shown schematically and somewhat more fully in Figure 25, in which the pivot bearing 196 constituting the valve sleeve is shown developed, and the passages in the gudgeon 36 are indicated as tubes superimposed upon the developed sleeve. As there shown, the valve grooves 287 and 289, with which the passageway 283 from the pump and the passageway 291 to the stabilizing cylinder 215 communicates respectively when the valve is in the position shown, appear as relatively short openings connected by the passageways 288 shown dotted along the back of the sleeve. When the table is turned in moving a work fixture out of the cutting zone E, the passageway 283 from the pump 265 moves out of communication with the groove 287, thereby cutting off the pressure to the stabilizing cylinder 215.

As may be seen by referring to Figure 14, at the time that the work fixture moves out of the cutting zone, the roller 206 on the stud 38 thereof passes from the straight line portion 214 of the cam 209 to an arcuate portion thereof, the radius of which is such that the work supporting slide 37 assumes a central position on the table 33. Under this condition, the piston 216 is moved to a central position within the cylinder 215, as shown in Figure 26, in which position both the inlet port 292 and the exhaust port 295 are closed. As the table 33 continues to turn in moving the work fixture to the unloading position, the piston 216 is moved in the same direction past the center position, thereby moving a port 293 into communication with the inlet port 292 at the time that the passageway 291 in the gudgeon moves into communication with the groove 287 in the sleeve, and the passageway 283 from the pump moves into communication with the groove 289. Further movement of the piston 216 then causes oil in the right end of the cylinder 215 to flow through a longitudinal passageway 299 in the piston, which connects with the port 293, and then out through the port 292 and back through the passageway 291 against the pressure exerted by the pump 265, the excess oil escaping through the relief valve 284. This expulsion of oil from the cylinder 215 back against the pump pressure occurs most rapidly at the time that the work supporting fixture approaches the cutting zone at rapid traverse rate; consequently, the cylinder 215 and the piston 216 function as a dashpot in checking the speed of the rotary table and in cushioning the transition from movement at rapid traverse rate to movement at feed rate. By the time that the succeeding work supporting fixture 34 has moved into the cutting zone E at feed rate, the piston 216 has been moved back by the straight line cam 40 to the end of its stroke and is beginning to move forward again under the pressure admitted through the passageway 291 and the port 292, which acts upon the piston 216 in direction tending to force the guiding rollers against the straight line cam 40, as previously explained. The piston, being symmetrically formed, functions in the same manner, when moved to either side of the mid-position in which it is shown in Figure 26 and acts with equal effectiveness upon either work fixture.

Before the rotary table 33 arrives at the point at which a work holding fixture enters the cutting zone, the vise of the work holder is closed to clamp the workpiece, as previously explained. To effect the clamping operation quickly, a relatively large volume of actuating liquid is admitted to the cylinder 230 associated with the vise. At this position of the gudgeon, the passageway 283 from the pump 265 is in communication with an arcuate groove 302 in the sleeve 196, shown in Figures 22 and 25, thereby placing it in communication with a port 303 leading into a passageway 304. The passageway 304 communicates with a groove 305 in the sleeve, which communicates with a passageway 306 leading to the cylinder 230 of the work holding fixture 35.

The pump 265 is of the type adapted to deliver a relatively large quantity of oil at relatively low pressure, and consequently the piston 231 is moved upward at relatively rapid rate to quickly clamp the workpiece lightly in the jaws of the vise. As the work holding fixture 35 enters the cutting zone, the passageway 283 from the pump and the port 303 move out of communication with the groove 302, as indicated in Figure 25. Under these conditions, pressure is supplied to the cylinder 230 from the pump 264 which discharges directly into the passageway 304. The pump 264 is of the type supplying a comparatively small quantity of oil at relatively high pressure, the high pressure oil passing through the passageway 304, the groove 305, and the passageway 306 to the cylinder 230, in manner to exert firm clamping pressure upon the workpiece in the vise.

In order that the clamping pressure may be adjusted to suit the particular workpiece being clamped, an adjustable pressure regulator 310 is provided and connected in manner shown in Figure 25. As there shown, a passageway 311 which communicates with the groove 305 leads to a spring pressed pressure regulating plunger 312 in the regulator 310.

As the work holding fixture 35 moves out of the cutting zone, the passageway 304 moves out of communication with the groove 305, and an exhaust passageway 314 moves into communication with the groove 305, thereby permitting the escape of oil from cylinder 230 through the passageway 306 and groove 305, into passageway 314, which leads to the inlet passageway 282 communicating with the inlet sides of the pumps. The discharge passageway 283 for the pump 265 next moves into communication with a groove 316 similar to and diametrically disposed from the groove 302, which again places it in communication with the port 303 and the passageway 304. The passageway 304 is then in communication with a groove 317, which connects it to a passageway 318 leading to the cylinder 230 associated with the work holding fixture 34, in manner to quickly fill this cylinder with low pressure oil. After the port 303 moves out of communication with the groove 316, high pressure oil from the pump 264 passes through the passageway 304, the groove 317, and the passageway 318, in manner to exert clamping pressure upon the piston 231.

From the groove 317, a passageway 319 leads to the pressure regulator 310, where it communicates with another spring pressed regulating plunger 320. The springs of both the plunger 312 and the plunger 320 may be regulated simultaneously by turning a hand wheel 321, which has a screw thread connection with an adjusting block 322 that engages both the springs. By this arrangement, the clamping pressures exerted upon the two clamping pistons may be adjusted simultaneously to effect the same clamping pressure in both the vises, the two systems being maintained independent of each other to provide for release of excessive pressure from either clamping cylinder at any time, the liquid in excess of that required to maintain the predetermined pressure escaping through a passageway 323, which is arranged to discharge into the sump 271.

In order that the clamping pressure in the cylinders may be ascertained readily, a pressure gauge 330 is provided on the machine and connected in manner to indicate the pressure being exerted upon the active clamping piston. For this purpose, a passageway 331 connected with the passageway 311, and a passageway 332 connected with the passageway 319, lead to opposite ends of a ball valve mechanism 333 to the center of which the pressure gauge 330 is connected by a passageway 334. A ball 335, which is free to move lengthwise of the chamber within the valve 333, permits the oil to flow from whichever line may be under pressure to the gauge 330, but prevents the oil from passing through the valve into the other line.

The passageways 306 and 318, which lead from the grooves 305 and 317, respectively, to the cylinders 230, associated with the work holding fixtures 34 and 35, are each formed partly in the gudgeon 36, as shown in Figure 11 and constituted partly by a flexible connecting member arranged for establishing connection from the gudgeon to the relatively movable work support. The flexible connecting mechanism includes a hollow stud 340 depending from the table 33 and connected to the passageway extending through the gudgeon, as shown in Figure 11, with regard to the passageway 306. The stud 340 is pivotally connected to a hollow block 341 arranged to slidingly receive a tube 342, as best shown in Figures 14 and 15, which is provided with an enlarged head 343 that is rotatably secured to the lower end of the stud 38 constituting the pivot axis of one of the work holding fixtures. As appears in the drawing, the stud 38 is formed hollow to provide communication with the cylinder 230, which is disposed concentrically therewith.

As a modification, the mechanism for prolonging the feed rate movement of the table to lengthen the loading period may be constituted as part of the hydraulic system, being arranged to be actuated hydraulically, as shown in Figures 23 and 24. As there shown, the actuating pedal 171 is pivotally mounted upon a control unit 346, which may be attached to the front of the machine, and is operatively connected to an arm 347 within the unit, which engages one end of a spring pressed valve plunger 348. When the pedal 171 is depressed, the valve plunger is moved upward within a cooperating valve casing 349 to a position in which a groove 350 on the plunger effects a connection between a passageway 351 leading from a pump which may be taken to represent one of the pumps mounted in the gudgeon 36 or any other suitable source of pressure, and a passageway 352 leading to a plunger actuating cylinder 353. Within the cylinder 353, the pressure fluid acts upon a piston 354, which is provided with a hollow piston rod 355 corresponding with the plunger 177, shown in Figure 12 and carrying at its forward end the spring-urged roller 184, which is adapted to enter beneath the shifting collar 131, as shown in Figure 24, when the piston 354 is moved forward within the cylinder 353 by the pressure fluid. When the pedal 171 is released, the valve plunger 348 is moved downward by a spring 357, thereby cutting off communication with the pressure passageway 352 and establishing communication with an exhaust passageway 358 in manner to permit the pressure to escape from the cylinder 353. A spring 359 in the cylinder 353 then moves the piston to the right, as shown in Figure 23, in manner to withdraw the roller 184 from beneath the shifting collar 131, thereby permitting it to move downward and shift the drive mechanism in direction to engage the rapid traverse drive.

The electric driving motor 61 is controlled by means of push buttons mounted in a convenient location at the front of the machine, as shown in Figures 1 and 2. As appears in Figures 1 and 2, the front of the cutting zone is guarded by means of a glass shield 428, which extends across the machine between the two front corner posts 424 and 426. This shield is more fully described and claimed in copending application, Serial No.

543,681, filed July 6, 1944, now Patent No. 2,443,734, granted June 22, 1948.

Another type of work clamping device for mounting on the work holding fixtures 34 and 35 is illustrated in Figures 16 and 17. This device is designated generally by the reference numeral 440, and it is generally similar to and constitutes a modification of the vise 220, shown mounted on the machine in Figures 1, 2, and 3. The modified vise 440 is adapted to be mounted on a work holding fixture for angular adjustment in manner similar to that in which the vise 220 is mounted, and it comprises essentially a body portion 444 carrying a fixed jaw 445 and a slidable relatively movable jaw 446, a pivoted lever 448, similar to the lever 234 in the vise 220, being provided for engagement by the actuating piston rod 232 for moving the jaw 446 toward the jaw 445, in the manner previously explained in connection with the vise 220, for clamping a workpiece therebetween.

The modified vise 440 differs from the previously described vise 220 primarily in that a compression spring 450 is provided for urging the vise jaws together to lightly clamp a workpiece prior to the application of the hydraulic clamping pressure. As may be seen in Figure 17, the spring 450 acts upon the movable clamping jaw 446 in direction tending to urge it toward the fixed jaw 445, an adjusting plug 451 being provided for adjusting the tension of the spring. In order to remove a workpiece from the vise 440, manually actuated means are provided for overcoming the clamping force of the spring 450. For this purpose, an actuating eccentric or cam 453 is rotatably mounted in the body 444 of the vise and is provided with an actuating hand lever 454, the arrangement being such that when the lever 454 is turned from the position shown in full lines in Figure 16 to the dotted line position, the eccentric 453 is turned in manner to engage the slide carrying the movable jaw 446 and move it away from the fixed jaw 445 against the resistance of the spring 450. After a finished workpiece has been removed and a new workpiece placed in the vise, the hand lever 454 is moved back to the position shown in full lines, thereby releasing the movable vise jaw and permitting the spring 450 to exert force for clamping the workpiece lightly between the jaws. With the workpiece thus held in position in the vise, the work carrying table may be rotated to move it toward the cutting zone, whereupon fluid pressure may be applied to firmly clamp the workpiece, as previously described.

From the foregoing description of an illustrative milling machine embodying this invention, it is apparent that there has been provided apparatus, which is capable of rapidly and automatically effecting machining of successive workpieces in a substantially continuous operation. As more fully explained hereinbefore, the machine is arranged to receive workpieces at a loading station at the forward edge of a rotary table, automatically clamp them, and quickly move the workpieces into cutting position by rotating the table at rapid traverse rate. The workpieces are then fed past the cutter along a straight line by turning the table at feed rate and guiding the work holder by means of a cam fixed in the machine bed. After the cutting operation has been completed, the workpieces are led away from the cutting zone without returning them past the cutter, by continuing the rotation of the table in the same direction at rapid traverse rate. The invention has further provided improved clutching mechanism, including selectively operable roller clutches for controlling rotation of the table, and improved hydraulic and electrical control systems for effecting control of the various functions of the machine, as well as other improvements in mechanisms and structural features tending to improve generally the efficiency and reliability of milling machines.

Although the foregoing description and the accompanying drawing have set forth the present invention for the most part in one exemplary mechanism, it is to be understood that the structure shown and described is intended only to be illustrative of an operative embodiment of the invention, and that it is contemplated that the various features may be incorporated in other structures, without departing from the spirit and scope of the invention, as defined in the subjoined claims.

The invention is hereby claimed as follows:

1. In a machine tool, the combination with a frame and a work supporting table movably mounted on said frame, of fluid pressure actuated clamping means mounted on said table for holding workpieces while being machined, a source of fluid pressure mounted on said table and conduit means including relatively movable cooperating valve elements carried by said frame and said table respectively and constituting selectively operating connecting means between said pressure source and said clamping means on said table, said valve elements being arranged to effect clamping of a workpiece in said clamping means when said table is in one position and unclamping thereof when said table is in another position, whereby workpieces may be securely held while being carried by said table through a cutting zone and then automatically unclamped after being machined.

2. In a machine tool having a frame, driving means supported in said frame, and a rotatable table mounted on said frame, the combination with hydraulically actuated means carried by said rotatable table and movable bodily therewith, of a pump carried bodily by said rotatable table, transmission means operatively connecting said driving means to said table to rotate it, transmission means operatively connecting said driving means to said pump in manner to operate it independently of rotation of said table, and a hydraulic circuit operatively connecting said pump to said hydraulically actuated means on said table, said circuit including means operative in response to rotation of said table for controlling said hydraulically actuated means.

3. In a hydraulic system, the combination with a sleeve constituting one element of a control valve and a gudgeon movably mounted within said sleeve and constituting the cooperating element of said valve, of a pump mounted within said gudgeon and movable bodily therewith, said pump being operatively connected to provide fluid pressure to said control valve, whereby hydraulically actuated mechanism movable bodily with said gudgeon may be operatively connected directly to said valve for actuation by said pump in accordance with the position of said gudgeon relative to said sleeve.

4. In a machine tool, the combination with a frame and a cutting tool carried by said frame, of a work-supporting table having a gudgeon rotatably journalled in said frame, means to rotate said table to move workpieces carried thereby into engagement with said cutting tool, hydraulically actuated clamping means carried by said table for clamping workpieces thereon, a source of fluid pressure for actuating said clamping means, and control valve mechanism including ports formed in said gudgeon, said valve ports functioning during rotation of said table to connect said pressure source to said clamping means for clamping and holding workpieces while they are being engaged by said cutting tool and to disconnect said pressure source after a cutting operation has been completed to permit removal of said workpieces.

5. In a machine tool having a frame, the combination with a movable element having a gudgeon journalled in said frame, of a pump mounted within said gudgeon and movable bodily therewith, hydraulically actuated mechanism carried by said movable element, hydraulic control passageways formed in said gudgeon and operatively connecting said pump to said mechanism, and a valve element carried by said frame and cooperating with said control passageways in said gudgeon in manner to control the operation of hydraulically actuated mechanism in accordance with the angular position of said movable element.

6. In a machine tool having a frame, driving means supported by said frame, and a table movably mounted on said frame, the combination with hydraulically actuated means carried by said table and movable bodily therewith, of a hydraulic pump carried bodily by said movable table, transmission mechanism operatively connecting said driving means to said table to move it, transmission means operatively connecting said driving means to said pump on said table in manner to operate it independently of movement of said table, and a hydraulic circuit operatively connecting said pump to said hydraulically actuated means on said table, said hydraulic circuit including control means operative in response to movement of said table for controlling said hydraulically actuated means.

7. In a machine tool having a stationary frame and a movable element rotatably mounted on said frame, the combination with hydraulically actuated mechanism and a pump both carried bodily by said rotatably mounted element, of a hydraulic circuit operatively connecting said pump to said mechanism, said circuit including passageways formed in part in said movable element and in part in said machine frame, whereby operation of said hydraulically actuated mechanism may be controlled in accordance with the angular position of said movable element relative to said frame.

8. In a machine tool having a frame, driving means supported by said frame, and a work supporting table movably mounted on said frame, the combination with hydraulically actuated clamping means mounted on said table for holding workpieces while moving bodily with said table, of a hydraulic pump carried bodily by said movable table, transmission mechanism operatively connecting said driving means to said table to move it, transmission means operatively connecting said driving means to said pump on said table in manner to operate it independently of movement of said table, and a hydraulic circuit including relatively movable cooperating valve elements carried by said frame and said table respectively and constituting selectively operating connecting means between said pump and said clamping means on said table, said valve elements being operative in response to movement of said table to effect clamping of a workpiece in said clamping means when said table is in one position and unclamping thereof when said table is in another position, whereby workpieces may be securely held while being carried by said table through a cutting zone and then automatically unclamped after being machined.

9. In a machine tool, the combination with a frame and a work supporting table movably mounted on said frame, of hydraulically actuated clamping means on said table for alternately clamping and unclamping workpieces at predetermined positions of table travel, a high pressure pump adapted to impress relatively high pressures on said hydraulic clamping means, a low pressure pump to furnish said means with a large volume of hydraulic fluid, and valve means connected intermediate said pumps and said clamping means, said valve means being operative to effect sequential operation of said clamping means.

10. A machine tool of the rotary table type comprising a bed, a table, a plurality of hydraulically actuated work retaining mechanisms on said table, a pivot member rotatably supporting said table in said bed, a source of fluid pressure, hydraulic control passageways in said bed connected to said source of pressure, hydraulic control passageways in said pivot member presenting ports disposed to register with said passageways in said bed, and hydraulic actuating means connected to said pivot passageways and disposed to actuate said work retaining mechanisms in a predetermined sequence dependent upon the radial position of said table in said bed.

11. In a machine tool having a base, a table movably mounted on said base, a plurality of work clamping mechanisms operably disposed on said table, a cutter disposed for movement relative to said table, and a hydraulic system to control the cyclic operation of said work clamping mechanisms, comprising a hydraulic actuating means for each of said mechanisms, a high pressure pump to supply fluid under high pressure to said means, a low pressure pump to furnish said means with a large volume of fluid, and a plurality of control valves operably dependent upon the rotation of said table to control fluid flow from said pumps to said actuating means in manner to effect a sequential operation of said clamping means.

12. In a machine tool, the combination with a frame and a work supporting table movably mounted on said frame, of hydraulically actuated clamping means mounted on said table for alternately clamping and unclamping workpieces at predetermined positions of table travel, a low pressure pump adapted to furnish said hydraulic clamping means with a large volume of hydraulic fluid, a high pressure pump adapted to impress relatively high pressures on said hydraulic clamping means, and a hydraulic circuit including valve means operatively connecting said pumps and said clamping means, said valve means being operative to effect sequentially light and firm clamping operations of said clamping means upon workpieces prior to unclamping them.

13. In a machine tool having a frame, driving means supported by said frame, and a work supporting table movably mounted on said frame, the combination with hydraulically actuated clamping means mounted on said table for holding workpieces while moving bodily with said table, of high pressure and low pressure hydraulic pumps carried bodily by said movable table, transmission mechanism operatively connecting said driving means to said table to move it, transmission means operatively connecting said driving means to said pumps on said table in manner to operate them independently of movement of said table, and a hydraulic circuit including relatively movable cooperating valve elements carried by said frame and said table respectively and constituting selectively operating connecting means between said pumps and said clamping means on said table, said valve elements being operative in response to movement of said table to effect light clamping of a workpiece in said clamping means when said table is in one position, firm clamping thereof when said table is in another position, and unclamping thereof when said table is in still another position, whereby workpieces may be lightly held while being moved by said table into cutting position, securely held while being carried by said table through a cutting zone and then automatically unclamped after being machined.

OTTO W. CARPENTER, JR.,
*Special Administrator of the Estate of Edward J. Kearney, Deceased.*
JOSEPH B. ARMITAGE.
WALTER M. POHL.

REFERENCES CITED

The following references are of record in the file of this patent:

UNITED STATES PATENTS

| Number | Name | Date |
|---|---|---|
| 1,405,622 | Oesterlein et al. | Feb. 7, 1922 |
| 1,469,360 | Cullen | Oct. 2, 1923 |
| 1,660,977 | Smith | Feb. 28, 1928 |
| 1,843,365 | Jackson | Feb. 2, 1932 |
| 1,897,386 | Ferris | Feb. 14, 1933 |
| 1,909,681 | Jackson | May 16, 1933 |
| 1,921,715 | Whitney et al. | Aug. 8, 1933 |
| 1,976,103 | Archea | Oct. 9, 1934 |
| 1,976,105 | Archea | Oct. 9, 1934 |
| 2,031,783 | Linder | Feb. 25, 1936 |
| 2,118,259 | Marsilius | May 24, 1938 |
| 2,271,041 | Stuckert | Jan. 27, 1942 |
| 2,292,988 | Bloomfield et al. | Aug. 11, 1942 |
| 2,355,082 | Kearney et al. | Aug. 8, 1944 |